(12) United States Patent
Qi et al.

(10) Patent No.: US 12,092,547 B2
(45) Date of Patent: Sep. 17, 2024

(54) METHOD FOR EVALUATING SPECTACLE LENS, AND SPECTACLE LENS

(71) Applicant: HOYA LENS THAILAND LTD., Pathumthani (TH)

(72) Inventors: Hua Qi, Tokyo (JP); Takahiro Uchidani, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 534 days.

(21) Appl. No.: 17/297,747

(22) PCT Filed: Dec. 11, 2019

(86) PCT No.: PCT/JP2019/048399
§ 371 (c)(1),
(2) Date: May 27, 2021

(87) PCT Pub. No.: WO2020/137534
PCT Pub. Date: Jul. 2, 2020

(65) Prior Publication Data
US 2022/0057293 A1 Feb. 24, 2022

(30) Foreign Application Priority Data
Dec. 28, 2018 (JP) .................... 2018-246717

(51) Int. Cl.
*A61B 3/00* (2006.01)
*G01M 11/02* (2006.01)
(Continued)

(52) U.S. Cl.
CPC ......... *G01M 11/0228* (2013.01); *G02C 7/024* (2013.01); *G02C 7/06* (2013.01); *G02C 2202/24* (2013.01)

(58) Field of Classification Search
CPC ..... G01M 11/0228; G02C 7/024; G02C 7/06; G02C 7/028; G02C 7/022; G02C 2202/24
(Continued)

(56) References Cited

U.S. PATENT DOCUMENTS 6,329,989 B1  12/2001  Qi et al.
2011/0051079 A1  3/2011  Martinez et al.
(Continued)

FOREIGN PATENT DOCUMENTS

CN  102007444 A  4/2011
CN  104678572 A  6/2015
(Continued)

OTHER PUBLICATIONS

PCT/JP2019/048399, English Translation of International Search Report, Mar. 10, 2020, 4 pages.
(Continued)

*Primary Examiner* — Mahidere S Sahle
(74) *Attorney, Agent, or Firm* — Kilpatrick Townsend & Stockton LLP

(57) ABSTRACT

Provided is a method for evaluating an eyeglass lens that has a plurality of convex portions on at least one of an object-side surface and an eyeball-side surface, in which the eyeglass lens is evaluated based on the number of rays at a plurality of focal positions A at which rays, which pave passed through the plurality of convex portions in a predetermined evaluation region of the eyeglass lens, converge when ray tracing is performed on the predetermined evaluation region, and technology related thereto.

8 Claims, 8 Drawing Sheets

(51) Int. Cl.
*G02C 3/00* (2006.01)
*G02C 7/00* (2006.01)
*G02C 7/02* (2006.01)
*G02C 7/06* (2006.01)

(58) Field of Classification Search
USPC ..... 351/159.05, 159.34, 159.41, 159.75, 246
See application file for complete search history.

(56) References Cited

U.S. PATENT DOCUMENTS

| | | | |
|---|---|---|---|
| 2012/0105801 A1* | 5/2012 | Yamakaji | G01M 11/0242 351/159.75 |
| 2014/0168607 A1 | 6/2014 | Qi | |
| 2016/0011437 A1 | 1/2016 | Nishimura et al. | |
| 2016/0306192 A1 | 10/2016 | Marshall et al. | |
| 2016/0377884 A1 | 12/2016 | Lau et al. | |
| 2017/0131567 A1 | 5/2017 | To et al. | |
| 2020/0132441 A1 | 4/2020 | Uchidani et al. | |

FOREIGN PATENT DOCUMENTS

| | | |
|---|---|---|
| EP | 2947505 A1 | 11/2015 |
| JP | 2000107129 A | 4/2000 |
| JP | 2010009690 A | 1/2010 |
| JP | 2017010031 A | 1/2017 |
| WO | 2018076057 A1 | 5/2018 |
| WO | 2018152595 A1 | 8/2018 |
| WO | 2019189847 A1 | 10/2019 |

OTHER PUBLICATIONS

PCT/JP2019/048399, International Preliminary Report on Patentability, Jul. 8, 2021, 11 pages.
EP19903237.6, "Extended European Search Report", Oct. 12, 2022, 15 pages.
Brown et al., "Predictions of stray light modeling on the ultimate performance of acousto-optic processors", Optical Engineering, Soc. of Photo-Optical Instrumentation Engineers, Bellingham, vol. 28, No. 12, Dec. 1, 1989, 1299-1305.
EP19903237.6, "Supplementary Partial European Search Report", Aug. 3, 2022, 16 pages.

* cited by examiner

FIG. 5

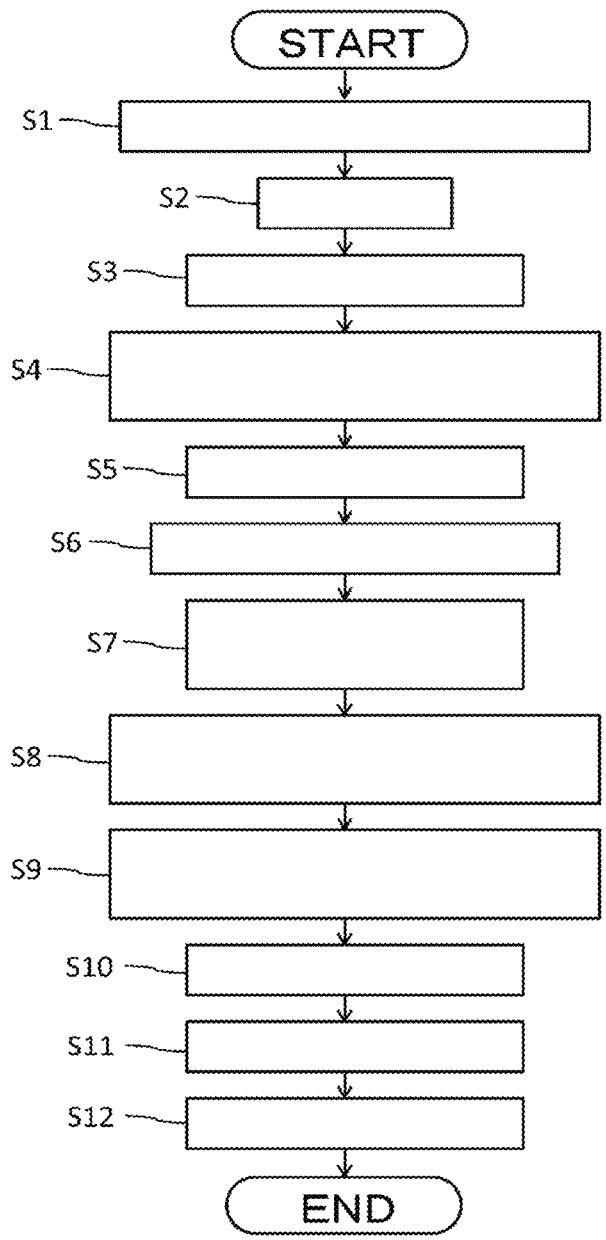

S1  Acquire raw data (three-dimensional data)
S2  Determine threshold
S3  Classify into each data group
S4  Extract reference shape data through fitting for each data group
S5  Create curved surface data
S6  Set eyeglass lens model
S7  Define portion where rays enter in ray tracing
S8  Specify convergence position (focal position) of rays entering each convex portion
S9  Specify convergence position (focal position) of rays entering base region converge
S10 Evaluate focal position
S11 Evaluate stray light
S12 Evaluate effective light quantity S301 Extract Z-coordinate value
S302 Z-coordinate value > threshold?
S303 Classify into base surface data
S304 Classify into segment data
S305 Classify into respective segments through clustering
S306 Calculate position of center of gravity in classified segment
S307 All data completed?
S308 Separate boundary-vicinity data through re-clustering a = Base region    b = Convex region
c = Boundary-vicinity region    d = Central coordinates

FIG. 13

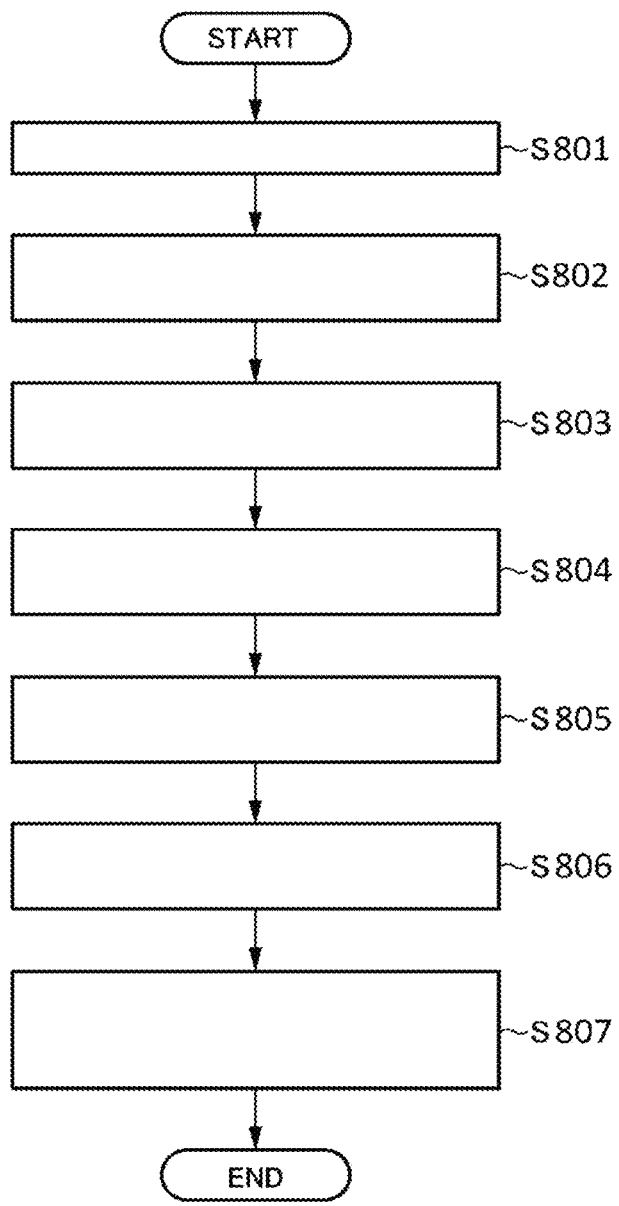

S801 Set measurement planes P1,1 to P1,n at interval of Δd
S802 Calculate densities of rays in measurement planes P1,1 to P1,n
S803 Specify measurement plane P1,i having maximum density in measurement planes P1,1 to P1,n
S804 Set measurement planes P2,1 and P2,2 at positions located separation distance Δd/2 frontward and rearward from measurement plane P1,i
S805 Calculate densities of rays in measurement planes P2,1 and P2,2
S806 Specify measurement plane with maximum density in measurement planes P2,1, P2,2 and P1,i
S807 Repeat step S207 to step S211 with half of separation distance until separation distance is sufficiently short.

METHOD FOR EVALUATING SPECTACLE LENS, AND SPECTACLE LENS

CROSS-REFERENCE TO RELATED APPLICATIONS

This application is the National Stage of International Application No. PCT/JP2019/048399 filed Dec. 11, 2019, which claims priority to Japanese Patent Application No. 2018-246717, filed Dec. 28, 2018, and the contents of which is hereby incorporated by reference.

TECHNICAL FIELD

The present disclosure relates to a method for evaluating an eyeglass lens and an eyeglass lens, and in particular, to a method for evaluating a myopia progression control lens and a myopia progression control lens.

BACKGROUND ART

An eyeglass lens for suppressing the progression of a refractive error such as myopia is disclosed in Patent Document 1 (US 2017-131567A). Specifically, minute convex portions having a spherical shape with a diameter of about 1 mm are formed on a convex surface, which is an object-side surface of the eyeglass lens, for example. With an eyeglass lens, normally, parallel rays that have entered from the object-side surface are emitted from the eyeball-side surface, and are focused on the wearer's retina (a predetermined position B in this specification). The position B will be referred to as a focal position B. On the other hand, light that has passed through minute convex portions enters the eyeglass lens, and the rays are focused at a plurality of positions A on the object side relative to the predetermined position B. The positions A will be referred to as focal positions A. The progression of myopia is suppressed due to a defocus power given by the minute convex portions.

CITATION LIST

Patent Documents

Patent Document 1: US 2017-131567A

SUMMARY OF DISCLOSURE

Technical Problem

Similarly to a usual eyeglass lens, the performance of the eyeglass lens disclosed in Patent Document 1 also needs to be evaluated. Examples of evaluation items include whether light is correctly focused at the focal positions A and the focal position B.

If a conventional eyeglass lens is used, it is possible to find a focal position on the eyeglass lens using a commercially available lens meter. However, if the eyeglass lens disclosed in Patent Document 1 is set in a lens meter, the diameter of minute convex portions on the eyeglass lens disclosed in Patent Document 1 is about 1 mm. Therefore, it is impossible or extremely difficult to find a focal position. Because there are plurality of minute convex portions, it is impossible or extremely difficult to find a focal position using a commercially available lens meter.

Use of a wavefront sensor may also be an option. However, a plurality of minute convex portions are present on the eyeglass lens disclosed in Patent Document 1, and thus it is impossible or extremely difficult to use a wavefront sensor, which is intended for measuring a continuous surface.

One embodiment of the present disclosure aims to enable evaluation of the performance of an eyeglass lens that has a plurality of convex portions on at least one of an object-side surface and an eyeball-side surface.

Solution to Problem

The inventors of the present disclosure conducted intensive studies to resolve the issue. Then, a plurality of focal positions A were found by using a ray tracing method for an eyeglass lens, and as a result, it was found that the performance of the eyeglass lens that has a plurality of convex portions is evaluated based on the number of rays at at least a plurality of focal positions A.

The present disclosure was made based on this finding.

A first aspect of the present disclosure is a method for evaluating an eyeglass lens that has a plurality of convex portions on at least one of an object-side surface and an eyeball-side surface, the method including evaluating the eyeglass lens based on the number of rays at a plurality of focal positions A at which rays, which have passed through the plurality of convex portions in a predetermined evaluation region of the eyeglass lens, converge when ray tracing is performed on the predetermined region.

A second aspect of the present disclosure is an aspect according to the first aspect, in which the plurality of focal positions A are specified based on coordinates and vectors of emitted portions of rays from the eyeglass lens that are obtained through ray tracing.

A third aspect of the present disclosure is an aspect according to the first or second aspect, in which the predetermined evaluation region has a size of a pupil diameter and a plurality of the predetermined evaluation regions are present.

A fourth aspect of the present disclosure is an aspect according to any of the first to third aspects, in which the eyeglass lens is evaluated based on the number of stray light rays that is obtained by subtracting, from the total number of rays when ray tracing is performed on the predetermined evaluation region, the total number of rays at the plurality of focal positions A at which rays, which have passed through the plurality of convex portions in the predetermined evaluation region, converge, and the number of rays at a focal position B at which rays, which have passed through a portion other than the plurality of convex portions in the predetermined evaluation region, converge, the focal position B being located on the eyeball side relative to the plurality of focal positions A.

A fifth aspect of the present disclosure is an aspect according to any of the first to fourth aspects, the fifth aspect including:

obtaining surface shape data of a surface that has the plurality of convex portions;

specifying the plurality of focal positions A at which rays, which have passed through the plurality of convex portions in the predetermined evaluation region, converge, and the focal position B at which rays, which have passed through a portion other than the plurality of convex portions in the predetermined evaluation region, converge, the focal position B being located on the eyeball side relative to the plurality of focal positions A, by performing ray tracing on a lens model obtained based on the surface shape data;

obtaining the total number of rays at the focal positions A and the number of rays at the focal position B; and evaluating the eyeglass lens based on the obtained number of rays.

A sixth aspect of the present disclosure is an eyeglass lens that has a plurality of convex portions on at least one of an object-side surface and an eyeball-side surface, in which a defocus power represented by a difference between an average of defocus values at focal positions A that respectively correspond to the convex portions in any predetermined evaluation region with a diameter of 2 to 6 mm, and a focus value at a focal position B at which rays, which have passed through a portion other than the plurality of convex portions in the predetermined evaluation region, converge, the focal position B being located on the eyeball side relative to the plurality of focal positions A, is within ±0.5 D with respect to a planned defocus power, and a ratio between the total number of rays P that converge at the focal positions A and the number of rays Q that converge at the focal position B when ray tracing is performed on the eyeglass lens satisfies 4:6 to 6:4.

Another aspect of the present disclosure is an aspect according to the sixth aspect, in which a percentage of the number of stray light rays to the total number of rays that pass through the predetermined evaluation region when ray tracing is performed on the eyeglass lens is 20% or less.

Another aspect of the present disclosure is an eyeglass lens that has a plurality of convex portions on at least one of an object-side surface and an eyeball-side surface, in which a defocus power represented by a difference between an average of defocus values at focal positions A that respectively correspond to the convex portions in any predetermined evaluation region with a diameter of 2 to 6 mm, and a focus value at a focal position B at which rays, which have passed through a portion other than the plurality of convex portions in the predetermined evaluation region, converge, the focal position B being located on the eyeball side relative to the plurality of focal positions A, is within ±0.5 D with respect to a planned defocus power.

Advantageous Effects of Disclosure

According to one embodiment of the present disclosure, it is possible to evaluate the performance of an eyeglass lens having a plurality of convex portions on at least one of an object-side surface and an eyeball-side surface.

BRIEF DESCRIPTION OF DRAWINGS

FIG. 5 is a flowchart showing the overview of a procedure in an evaluation method according to an aspect of the present disclosure.

FIG. 13 is a flowchart showing a method for specifying a position on which rays are focused.

DESCRIPTION OF EMBODIMENTS

Hereinafter, an aspect of the present disclosure will be described. The description based on the drawings below is exemplary, and the present disclosure is not limited to the aspects that are described as examples.

[Method for Evaluating Eyeglass Lens According to One Aspect of the Present Disclosure]

A method for evaluating an eyeglass lens according to one aspect of the present disclosure is as follows.

"A method for evaluating an eyeglass lens that has a plurality of convex portions on at least one of an object-side surface and an eyeball-side surface, the method including evaluating the eyeglass lens based on the number of rays at a plurality of focal positions A at which rays, which have passed through the plurality of convex portions in a predetermined evaluation region of the eyeglass lens, converge when ray tracing is performed on the predetermined region.

With the eyeglass lens disclosed in Patent Document 1, it is impossible or extremely difficult to find a focal position with a commercially available lens meter. However, according to one aspect of the present disclosure, a plurality of focal positions A can be specified by using a ray tracing method for a predetermined evaluation region that includes a portion of the eyeglass lens at which convex portions are included, and the number of rays at the plurality of focal positions A at which rays, which have passed through the convex portions, converge can also be found.

As a result, according to one aspect of the present disclosure, it is possible to evaluate the performance of an eyeglass lens having a plurality of convex portions on at least one of the object-side surface and the eyeball-side surface.

[Details of Method for Evaluating Eyeglass Lens According to One Aspect of the Present Disclosure]

Hereinafter, further specific examples, preferable examples, and variations of an aspect of the present disclosure will be described.

(1) Configuration of Eyeglass Lens (Overall Configuration of Eyeglass Lens)

Figure 1:
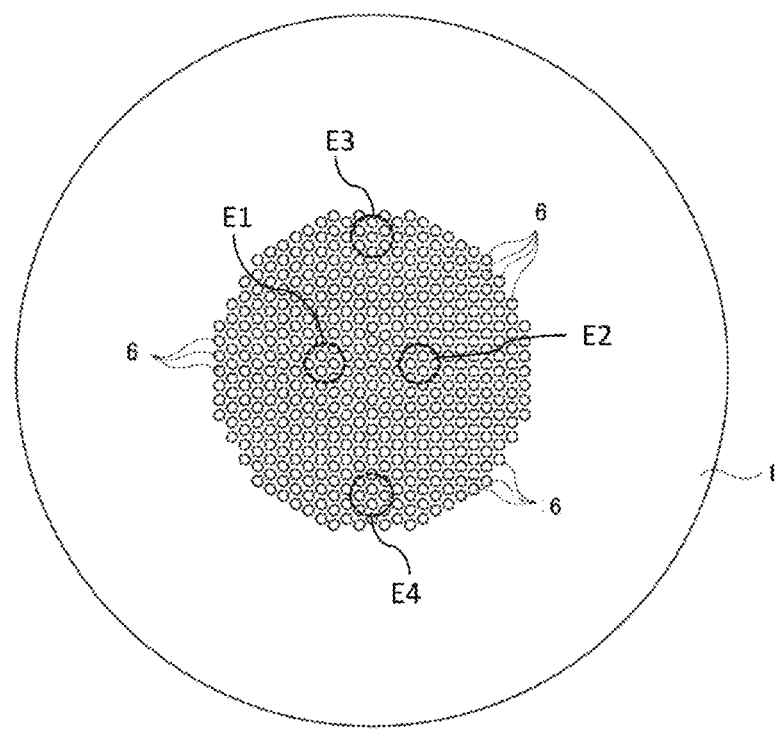
FIG. 1 is a front view showing the shape of an eyeglass lens to be evaluated in an aspect of the present disclosure.

FIG. 1 is a front view showing the shape of an eyeglass lens to be evaluated in an aspect of the present disclosure.

As shown in FIG. 1, an eyeglass lens 1 has a plurality of convex portions 6 that are arranged regularly in the vicinity of the lens center. The convex portions 6 will be described later in detail.

Figure 2:
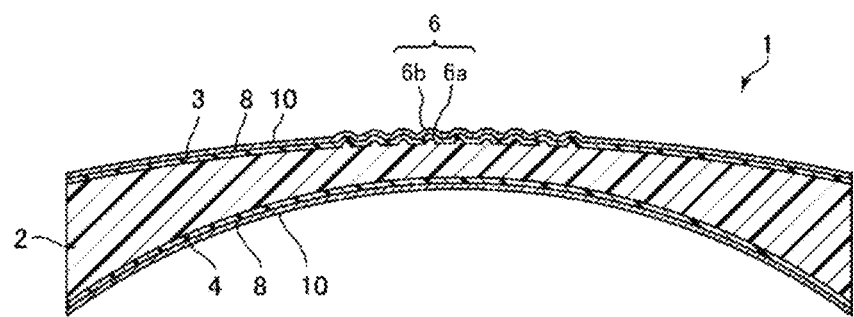
FIG. 2 is a cross-sectional view showing a configuration example of the eyeglass lens shown in FIG. 1.

FIG. 2 is a cross-sectional view showing a configuration example of the eyeglass lens shown in FIG. 1.

As shown in FIG. 2, the eyeglass lens 1 has an object-side surface 3 and an eyeball-side surface 4. The "object-side surface" is the surface that is located on the object side when a wearer wears the glasses including the eyeglass lens 1. The "eyeball-side surface" is the surface that is located on the opposite side, that is, the eyeball side, when the wearer wears the glasses including the eyeglass lens 1. In one aspect of the present disclosure, the object-side surface 3 is a convex surface, and the eyeball-side surface 4 is a concave surface. That is, the eyeglass lens 1 according to one aspect of the present disclosure is a meniscus lens.

Also, the eyeglass lens 1 is constituted by a lens base member 2, hard coating films 8 that are respectively formed on the convex surface side and the concave surface side of the lens base member 2, and antireflection films (AR film) 10 that are respectively formed on the surfaces of the hard coating films 8. Note that the eyeglass lens 1 may be provided with another film, in addition to the hard coating films 8 and the antireflection films 10.

(Lens Base Member)

The lens base member 2 is made of a thermosetting resin material such as a thiourethane resin, an allyl resin, an acrylic resin, or an epithio resin material, for example. Note that another resin material having a desired refractivity may be selected as the resin material constituting the lens base member 2. Also, the lens base member 2 may be a lens base member made of inorganic glass, instead of a resin material.

In one aspect of the present disclosure, the object-side surface 3 (convex surface) of the lens base member 2 is provided with a plurality of convex portions 6a such that the convex portions 6a protrude from the object-side surface 3 toward the object. Each convex portion 6a is constituted by a curved surface having a curvature different from that of the object-side surface 3 of the lens base member 2. Because such convex portions 6a are formed, the convex portions 6a having a substantially circular shape are arranged on the object-side surface 3 of the lens base member 2 in the form of islands (i.e., in a state in which the convex portions 6a are spaced apart from each other without being in contact with each other) at equal intervals in the circumferential direction and the radius direction around the lens center in a plan view. Note that a plurality of convex portions 6a may be formed on the object-side surface 4 (the concave surface) of the lens base member 2. Also, a plurality of convex portions 6a may be formed on both surfaces, that is, the convex surface and the concave surface. For convenience of description, a case where a plurality of convex portions 6a are formed on the object-side surface 3 (the convex surface) will be described as an example hereinafter.

(Hard Coating Film)

The hard coating film 8 is formed using a thermoplastic resin or a UV-curable resin, for example. The hard coating film 8 can be formed using a method of immersing the lens base member 2 in a hard coating liquid, through spin coating, or the like. An improvement in durability of the eyeglass lens 1 is achieved through this coating with the hard coating film 8.

(Antireflection Film)

The antireflection film 10 is formed by forming a film of an antireflection agent such as $ZrO_2$, $MgF_2$, or $Al_2O_3$ through vacuum deposition, for example. The visibility of an image seen through the eyeglass lens 1 can be improved by covering the eyeglass lens 1 with the antireflection film 10.

(Shape of Object-Side Surface)

As described above, a plurality of convex portions 6a are formed on the object-side surface 3 of the lens base member 2. Thus, when the surface 3 thereof is coated with the hard coating film 8 and the antireflection film 10, a plurality of convex portions 6b are formed in conformity with the convex portions 6a on the lens base member 2 by the hard coating film 8 and the antireflection film 10 as well. In other words, the convex portions 6 constituted by the convex portions 6a and the convex portions 6b are arranged on the object-side surface 3 (convex surface) of the eyeglass lens 1 so as to protrude from the surface 3 toward the object.

The convex portions 6 conform to the convex portions 6a of the lens base member 2, and therefore, similarly to the convex portions 6a, the convex portions 6 are arranged in the form of islands in a state of being arranged at an equal interval in the axial direction and in the circumferential direction around the lens center, that is, being arranged regularly in the vicinity of the lens center. Note that, as disclosed in FIG. 11 of Patent Document 1 and FIG. 1 of this disclosure, the convex portions 6 may be provided on locations of the lens center through which the optical axis passes, or, as disclosed in FIG. 1 of Patent Document 1, a region where the convex portions 6 are not provided may be ensured on a location through which the optical axis passes.

The convex portions 6 are each constituted as follows, for example. It is preferable that the diameter of the convex portion 6 is about 0.8 to 2.0 mm. It is preferable that the protrusion height (protrusion amount) of the convex portion 6 is about 0.1 to 10 μm, and preferably about 0.7 to 0.9 μm. It is preferable that the convex portion 6 has a spherical shape with a radius of curvature of about 50 to 250 mmR, or more preferably about 86 mmR. By using this kind of configuration, the refractive power of the convex portion 6 is set to be about 2.0 to 5.0 diopters greater than the refractive power of the region where the convex portions 6 are not formed.

(Optical Properties)

With the eyeglass lens 1 having the above-described configuration, the following optical properties can be realized due to the object-side surface 3 having the convex portions 6, and as a result, it is possible to suppress the progression of a refractive error such as myopia of the wearer of the glasses.

Figure 3:
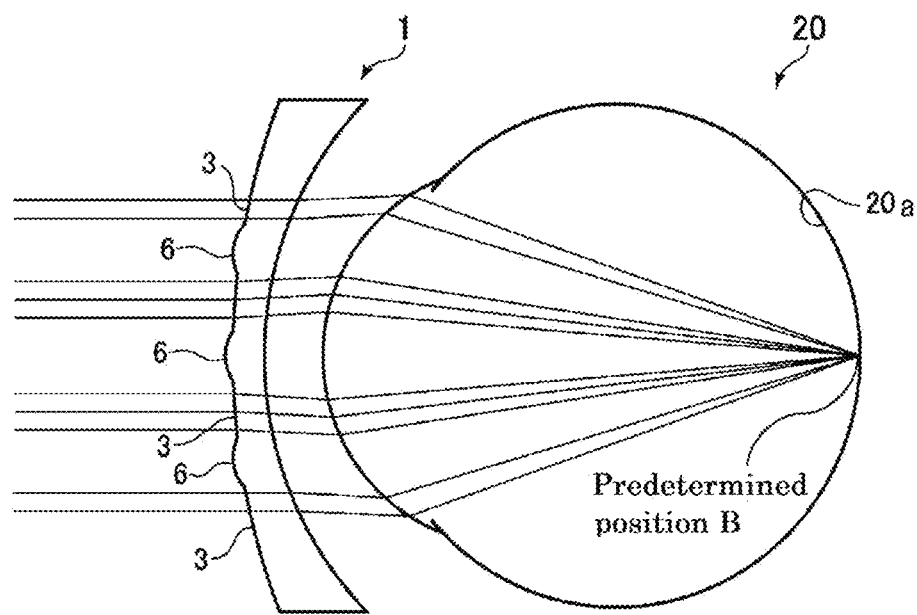
FIG. 3 is a schematic cross-sectional view (1) showing a path of light passing through the eyeglass lens shown in FIG. 1.

FIG. 3 is a schematic cross-sectional view (1) showing a path of light passing through the eyeglass lens shown in FIG. 1.

As shown in FIG. 3, the light that has entered the object-side surface 3 of the eyeglass lens 1 in a region (referred to a "base region" hereinafter) where the convex portions 6 are not formed is emitted from the eyeball-side surface 4 and is focused on a retina 20a of an eyeball 20. That is, in principle, the rays passing through the eyeglass lens 1 are focused on the retina 20a of the wearer of the glasses. In other words, the curvature of the base region of the eyeglass lens 1 is set according to the prescription of the wearer of the glasses, such that a focal point is formed on the retina 20a, which is the predetermined position B.

Figure 4:
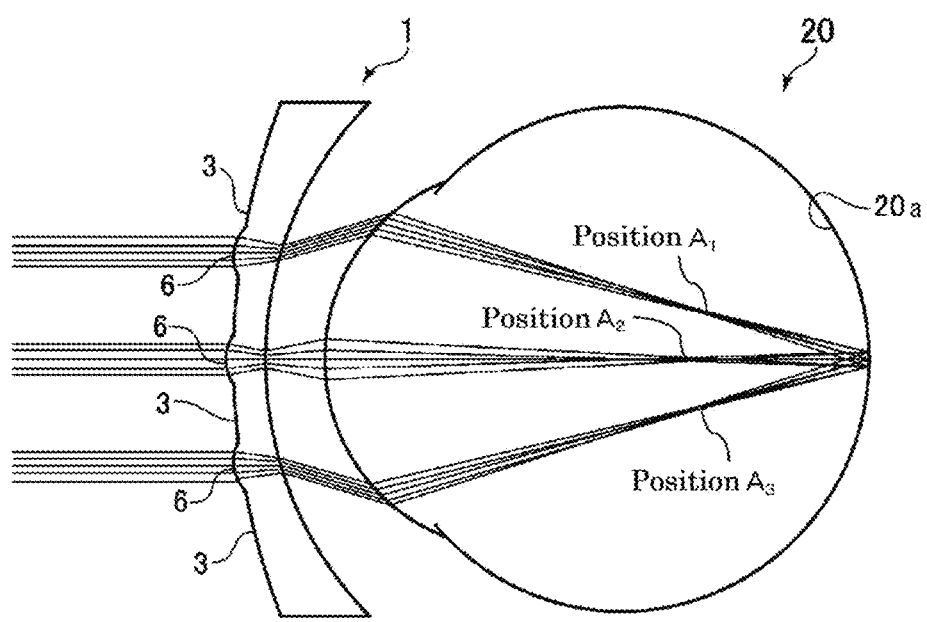
FIG. 4 is a schematic cross-sectional view (2) showing a path of light passing through the eyeglass lens shown in FIG. 1.

FIG. 4 is a schematic cross-sectional view (2) showing the path of light passing through the eyeglass lens shown in FIG. 1.

On the other hand, as shown in FIG. 4, the light that has entered the convex portions 6 of the eyeglass lens 1 is emitted from the eyeball-side surface 4 and is focused at a position on the object side relative to the retina 20a of the eyeball 20. That is, the convex portions 6 cause light emitted from the eyeball-side surface 4 to converge at positions A on the object side relative to the position B. The focal positions A are present as positions $A_1, A_2, A_3, \ldots$, and $A_N$ (N is the total number of convex portions 6) according to each of the plurality of convex portions 6.

In this manner, in principle, the eyeglass lens 1 causes the rays that have entered from the object-side surface 3 to be emitted from the eyeball-side surface 4 and to converge at the predetermined position B. On the other hand, the eyeglass lens 1 causes the rays to converge at the positions A ($A_1$, $A_2$, $A_3$, ..., and $A_N$) on the object side relative to the predetermined position B in the portion where the convex portions 6 are arranged. That is, the eyeglass lens 1 has the function of causing the rays to converge at the positions A on the object side relative thereto, which is different from the ray converging function for realizing the prescription of the wearer of the glasses. The eyeglass lens 1 can exhibit the effect of suppressing the progression of a refractive error such as myopia of the wearer of the glasses (referred to as a "myopia progression control effect" hereinafter) due to having such optical properties.

(2) Evaluation Procedure

Next, a procedure for evaluating the surface shape of the eyeglass lens 1 having the above-described configuration, that is, one example of the procedure of a method for evaluating an eyeglass lens according to one aspect of the present disclosure will be described in detail.

One aspect of the present disclosure mainly includes the following:
- obtaining surface shape data of a surface that has a plurality of convex portions
- specifying the plurality of focal positions A at which rays, which have passed through the plurality of convex portions in a predetermined evaluation region, converge, and the focal position B at which rays, which have passed through a portion other than the plurality of convex portions in the predetermined evaluation region, converge, the focal position B being located on the eyeball side relative to the plurality of focal positions A, by performing ray tracing on a lens model obtained based on the surface shape data
- obtaining the total number of rays at the focal positions A and the number of rays at the focal position B
- evaluating the eyeglass lens based on the obtained number of rays The following describes each step and one aspect in which another step is added to those steps. Note that, as the order of description, first, the overall evaluation method will be described by describing the overview of each step, and then, steps that needs to be separately described in detail will be described later.

FIG. 5 is a flowchart showing an overview of a procedure of an evaluation method according to one aspect of the present disclosure.

(1. Acquisition of Raw Data (Three-Dimensional Data))

As shown in FIG. 5, when the surface shape of the object-side surface 3 of the eyeglass lens 1 is evaluated, first, three-dimensional data regarding the surface shape of the object-side surface 3 of the eyeglass lens 1 to be evaluated is acquired by measuring the surface shape of the object-side surface 3 as a first step (step 1; step will be abbreviated as "S" hereinafter). The three-dimensional data need only be acquired using a known three-dimensional measuring device. Accordingly, with regard to the surface shape of the object-side surface 3, XYZ-coordinate value data obtained by measuring the Z-coordinates at equal pitches on the XY coordinates is obtained as raw data (three-dimensional data).

(2. Determination of Threshold)

When three-dimensional data is acquired, subsequently, a threshold that is required for classification of data into data groups, which will be described later, is determined as a second step (S2). The threshold is determined through derivation from the acquired three-dimensional data.

More specifically, when the height threshold is determined, the minimum value and the maximum value of the height data of the shape subjected to shape removal are applied to the vertical axis of a load curve graph, and the interval therebetween is finely divided and scaled at certain pitches. Then, a ratio of height data points at higher positions of the shapes subjected to shape removal to data points at height positions indicated by the scales is obtained, the ratio is plotted on the horizontal axis of the load curve graph, and the plot points are connected to obtain a load curve (bearing curve). In this manner, in a graph with the height applied to the vertical axis and the ratio applied to the horizontal axis, points located between 50% and 60% on the horizontal axis of the load curve (bearing curve) and points located between 70% and 80% are connected with a straight line, and the value of the height scale where the straight line and the vertical axis intersect each other is determined as a height threshold (i.e., a threshold derived from three-dimensional data).

Note that, in addition to the calculation method utilizing the above-described bearing curve, the threshold can be determined using a method in which an intermediate height between the minimum value and the maximum value of height data regarding the shapes subjected to shape removal, for example, and a position about 20% to 40% above the minimum distance between the minimum value and the maximum value is determined as a height threshold based on empirical data, for example.

(3. Classification into Data Groups)

After the threshold has been determined, as a third step, cluster analysis is performed on the acquired three-dimensional data using the threshold, and the three-dimensional data is classified into data groups (S3). The data groups into which data is to be classified include at least a data group regarding the convex portions 6 and a data group regarding the base region, and preferably also include a data group regarding a boundary-vicinity region, which will be described later in detail.

In one aspect of the present disclosure, a case where a plurality of locations that include the data group regarding the convex portions 6 and the data group regarding the base region are respectively set as predetermined evaluation regions will be described as an example. Note that there is no particular limitation on the shape of a predetermined evaluation region, and the shape thereof may be a circular shape in a plan view with a diameter of 2 to 6 mm, which is equivalent to a ray diameter used in an existing ray tracing method and has a size corresponding to the pupil diameter, or a rectangular shape with a size corresponding to the pupil diameter. That is, this circular shape in a plan view and this rectangular shape may have the size of the pupil diameter. Also, at least the diameters or shapes of the predetermined evaluation regions may be different from each other.

When a plurality of predetermined evaluation regions are set, a plurality of predetermined evaluation regions may be provided so as to include the entire portion having convex portions on a surface of the eyeglass lens. However, in this case, it will take a lot of time and effort. Therefore, predetermined evaluation regions may be provided on several locations (e.g., two to six locations), and (10. Evaluation of focal positions), (11. Evaluation of stray light), (12. Evaluation of number of effective rays), and the like, which will be described later, may be performed on those several locations. As shown in FIG. 1, for example, two predetermined evaluation regions E1 and E2 may be provided in the vicinity of the optical axis with the optical axis interposed therebetween in the horizontal direction, two predetermined evaluation regions E3 and E4 may be provided at a distance farther from the optical axis than the two regions with the optical axis interposed therebetween in the vertical direction, and the later-described evaluation may be performed on the four regions in total. However, there is no particular limitation on the positions of the predetermined evaluation regions, and they may be provided at any positions.

Note that a specific procedure for classification of data into data groups utilizing cluster analysis will be described later in detail.

(4. Extraction of Reference Shape Data Through Fitting for Each Data Group)

After the three-dimensional data has been classified into the data groups, as a fourth step, curve fitting is performed on each of the data groups into which the data is classified, data regarding curved surface shapes obtained through curve fitting is combined, and reference shape data regarding the object-side surface 3 of the eyeglass lens is extracted (S4). Curve fitting is performed on each of the data groups. Specifically, spherical approximation is performed using the method of least squares on the data group regarding the convex portions 6 and the data group regarding the base region, for example. Accordingly, data regarding a curved surface shape expressing an approximate sphere can be obtained for each convex portion 6 and the base region. Then, the curved surface shape data regarding the individual curved surface shapes obtained in this manner is combined to obtain shape data for one surface shape. Accordingly, shape data regarding the shape of the object-side surface 3 of the eyeglass lens from which error components such as roughness and sagging have been removed (i.e., a shape serving as a reference) is extracted as reference shape data.

The steps up to here are summarized as the following configuration.

The method includes: with regard to an eyeglass lens that has a plurality of convex regions, which protrude toward an object, on an object-side surface, acquiring three-dimensional surface shape data of the object-side surface of the eyeglass lens by measuring the surface shape;

classifying the three-dimensional data into data groups regarding the plurality of respective convex regions and a data group regarding a base region, which is a region where the convex regions are not formed, by performing cluster analysis on the three-dimensional data; and combining curved surface shape data obtained by performing curve fitting on each of the data groups into which the data is classified, and extracting reference shape data regarding the object-side surface of the eyeglass lens.

The following configuration may be added to this configuration.

Data is classified into data groups regarding the convex regions and a data group regarding the base region based on a threshold derived from three-dimensional data.

The threshold is determined by approximating three-dimensional data using the method of least squares, and utilizing a bearing curve regarding the result of the approximation.

Classification of data into data groups regarding the plurality of respective convex regions is performed utilizing k-means described in (Details of cluster analysis), which will be described later.

In the classifying three-dimensional data into data groups, as described in (Details of cluster analysis), which will be described later, the three-dimensional data is classified into a data group regarding the convex regions, a data group regarding the base region, and a data group regarding boundary-vicinity regions, which are transition regions between the convex regions and the base region.

(5. Creation of Surface Shape Data)

Surface shape data is created from the extracted reference shape data in the fifth step (S5). As a specific example, surface shape data for a curved surface may be created by performing spline interpolation on the reference shape data that is the XYZ coordinate value data, for example.

(6. Setting of a Model of Eyeglass Lens)

In this sixth step, a model (lens model) of the eyeglass lens for performing measurement using a ray tracing method is set (S6). This lens model and the actual eyeglass lens are also collectively referred to as "eyeglass lens", and the lens model is also simply referred to as "surface shape data".

Specifically, any surface shape data is arranged on the opposite surface (concave surface) of the surface shape data of the object-side surface 3 (convex surface) created in the fifth step. Surface shape data of a shape capable of realizing predetermined prescription values (spherical power S, astigmatism power C, astigmatism axis Ax, prism Δ) when light passes through the object-side surface 3 and the eyeball-side surface 4 is set, and the distance (lens thickness) and the inclination between the object-side surface 3 and the eyeball-side surface 4 are set, for example. Note that the shape of the opposite surface (concave surface) may be assumed to be a spherical shape or a toric surface. The surface shape data of such an opposite surface (concave surface), and the distance and inclination can be obtained through computer simulation.

One of the major characteristics of one aspect of the present disclosure is enabling measurement using a ray tracing method on not only an actual eyeglass lens, but also on a lens model that can be obtained from the actual eyeglass lens through the first to fifth steps and this sixth step.

If an actual eyeglass lens is used, an eyeball model (the axial length of the eye and the like) needs to be created. Also, the forward tilt angle and tilt angle of an eyeglass frame, PD (pupillary distance), CVD (corneal vertex distance between the vertex of the eyeball-side surface 4 of the eyeglass lens and the vertex of the cornea) and the like need to be set. Therefore, if the actual eyeglass lens is used, a lot of effort is required. On the other hand, if a lens model is created and used as in one aspect of the present disclosure, such effort is not required. As a result, it is possible to efficiently carry out the method for evaluating an eyeglass lens.

(7. Definition of Portion where Rays Enter in Ray Tracing)

In the seventh step, rays that enter the lens model are divided into two, specifically, rays that enter the plurality of convex portions 6 and rays that enter the base region (S7). In this division into two, the data regarding a curved surface shape expressing an approximate sphere that is obtained for each of the convex portions 6 and the base region is used in (4. Extraction of reference shape data through fitting for each data group). It is possible to distinguish between the rays that enter the plurality of convex portions 6 and the rays that enter the base region, using these pieces of curved surface shape data.

(8. Specifying of Convergence Position (Focal Position) of Rays that Enter Convex Portions)

In this eighth step, a plurality of focal positions A at which rays, which have passed through the convex portions, converge, and the focal position B at which rays, which have passed through a portion other than the convex portions, converge, the focal position B being located on the eyeball side relative to the plurality of focal positions A are specified by performing ray tracing on the surface shape data (S8, S9). Specifically, the focal positions are specified with the following procedure.

First, locations to be subjected to a ray tracing process are predetermined evaluation regions set on the eyeglass lens. In one aspect of the present disclosure, a case where the ray tracing process is performed on one predetermined evaluation region E1 out of the predetermined evaluation regions E1 to E4 shown in FIG. 1 will be described as an example.

Figure 6:
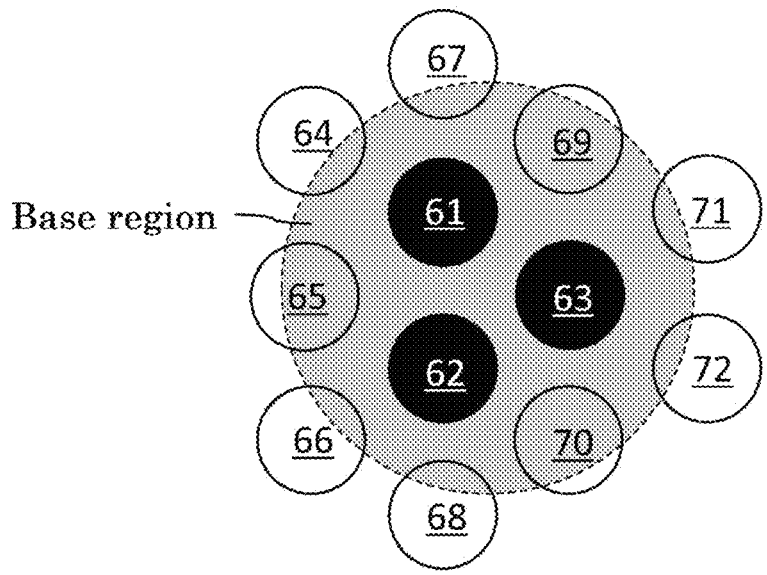
FIG. 6 is a diagram showing an enlarged view of a predetermined evaluation region E1 shown in FIG. 1.

FIG. 6 is a diagram showing an enlarged view of the predetermined evaluation region E1 in FIG. 1.

As shown in FIG. 6, a plurality of convex portions 6 are present in the predetermined evaluation region E1. Specifically, all of the three convex portions 61 to 63 are present in the predetermined evaluation region E1, and only portions of the nine convex portions 64 to 72 are present therein.

Through the ray tracing process, a plurality of evenly distributed parallel rays are emitted from a point light source at infinity when viewed from any surface of the lens model, and the PSF (Point Spread Function) representing the luminance distribution of the rays that have passed through the lens model can be obtained. The PSF can be obtained by tracing a large number of rays emitted from the point light source and calculating the density of spots on any plane. Then, the position (plane) on which rays are most focused in any plane is specified by comparing the PSFs in the relevant plane. Note that the diameter of rays need only be set based on the pupil diameter, and may be set to 40, for example. Thereafter, the plurality of focal positions A at which rays, which have passed through the plurality of convex portions in a predetermined evaluation region, converge are specified.

Note that when the focal positions A are specified (also, when the number of rays is evaluated as described in (11. Evaluation of stray light), which will be described later), the convex portions 64 to 72, which are only partially present in the predetermined evaluation region E1, may also be used, in addition to the three convex portions 61 to 63. In one aspect of the present disclosure, a case where all of the three convex portions 61 to 63 present in the predetermined evaluation region are employed will be described as an example.

Figure 7:
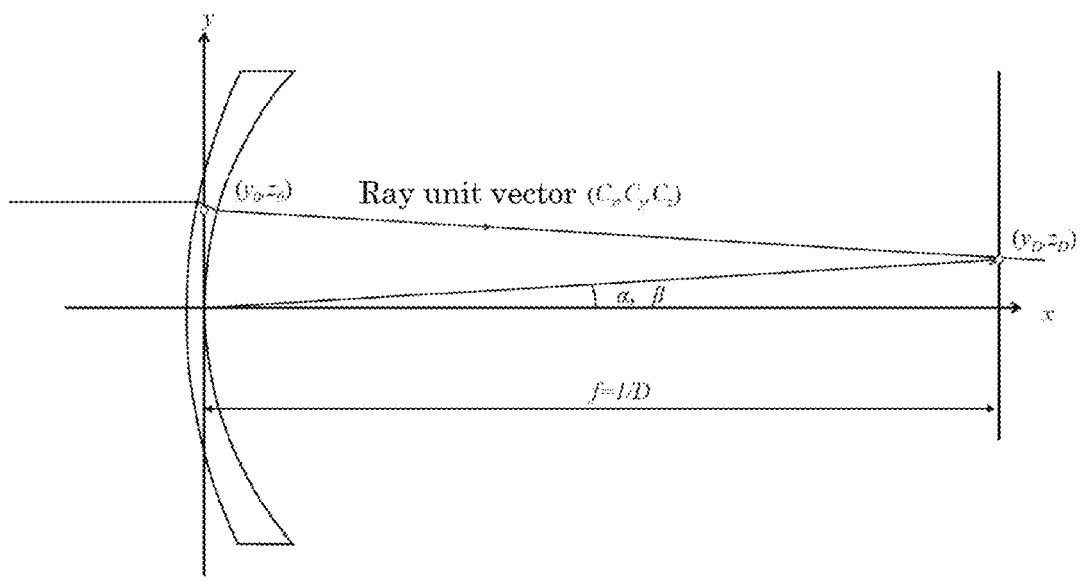
FIG. 7 is a diagram illustrating a method for specifying a position on which rays are focused in an aspect of the present disclosure.

FIG. 7 is a diagram illustrating a method for specifying a position on which rays are focused in one aspect of the present disclosure.

It is possible to distinguish between rays that enter the plurality of convex portions 6 in one predetermined evaluation region and rays that enter the base region due to (7. Definition of portion where rays enter in ray tracing). Also, as long as three-dimensional coordinates (intersection coordinates) at which rays that each enter one of the multiple convex portions 6 cross each other can be obtained at other convex portions 62 and 63 as well, locations at which intersection coordinates are arranged in groups can be considered focus positions A ($A_1$, $A_2$, $A_3$).

Through a ray tracing process, the coordinates of the emitted portions of the rays from the lens model that enter the multiple convex portions 6 and the vectors from the emitted portions can be found. In view of this, the average value of the intersection coordinates is obtained using the coordinates and the vector. The residual of each intersection coordinate from the average value of the intersection coordinates being small means that the rays are concentrated at locations corresponding to the respective convex portions 6. Based on this idea, a location at which the residual from the average value of the intersection coordinates reaches its minimum (in this aspect, a location separated by only a distance f(=1/D (defocus value, in units of diopters)) in the optical axis direction from the vertex of the eyeball-side surface 4 (concave surface)) is specified.

It is presumed that the direction of an optical axis (a direction extending from the object side toward the eyeball) is the X-direction, the horizontal (right-left) direction is the Y-direction, and the top-bottom (up-down) direction is the Z-direction.

The coordinates of a portion of a ray that has passed through one convex portion 61 and is emitted from the lens model are set to ($y_0$, $z_0$)

The vector of the portion of the ray that has passed through one convex portion 61 and is emitted from the lens model is set to ($C_x$, $C_y$, $C_z$).

The intersection coordinates of rays that have passed through one convex portion 61 and intersect with each other are set to ($y_D$, $z_D$).

The intersection coordinates ($y_D$, $z_D$) are expressed by (Equation 1) and (Equation 2) below.

[Mathematical 1]

$$y_D = \frac{C_y}{C_x} f + y_0 \qquad \text{(Equation 1)}$$

$$z_D = \frac{C_z}{C_x} f + z_0 \qquad \text{(Equation 2)}$$

The angle from the vertex of the eyeball-side surface 4 (concave surface) to the intersection coordinates ($y_D$, $z_D$) is expressed by (Equation 3) and (Equation 4) below. Note that α indicates the angle when viewed from the Y-axial direction, and β indicates the angle when viewed from the Z-axial direction.

[Mathematical 2]

$$\tan \alpha = t_D = \frac{y_D}{f} = \frac{C_y}{C_x} + \frac{y_0}{f} = \frac{C_y}{C_x} + y_0 D = t_0 + y_0 D \qquad \text{(Equation 3)}$$

$$\tan \beta = c_D = \frac{z_D}{f} = \frac{C_z}{C_x} + \frac{z_0}{f} = \frac{C_z}{C_x} + z_0 D = c_0 + z_0 D \qquad \text{(Equation 4)}$$

The average value of the intersection coordinates ($y_D$, $z_D$) is expressed by (Equation 5) and (Equation 6) below.

[Mathematical 3]

$$\bar{t} = \frac{1}{n} \sum_i t_{Di} = \frac{1}{n} \sum_i t_{0i} + D \frac{1}{n} \sum_i y_{0i} = \overline{t_0} + \overline{y_0} D \qquad \text{(Equation 5)}$$

$$\bar{c} = \frac{1}{n} \sum_i c_{Di} = \frac{1}{n} \sum_i c_{0i} + D \frac{1}{n} \sum_i z_{0i} = \overline{c_0} + \overline{z_0} D \qquad \text{(Equation 6)}$$

Also, when a plurality of focal positions A are specified, the method of least squares is used in order to obtain the minimum residual of each intersection coordinate from the average value of the intersection coordinates. Hereinafter, a specific aspect will be described.

The residual of each intersection coordinate from the average value of intersection coordinates is expressed by (Equation 7) below.

[Mathematical 4]

$$S(D) = \frac{1}{n}\sum_i ((t_{Di} - \bar{t})^2 + (c_{Di} - \bar{c})^2) = \quad \text{(Equation 7)}$$

$$\frac{1}{n}\sum_i (t_{Di}^2 - 2t_{Di}\bar{t} + \bar{t}^2 + c_{Di}^2 - 2c_{Di}\bar{c} + \bar{c}^2) =$$

$$\frac{1}{n}\sum_i t_{Di}^2 - 2\bar{t}\frac{1}{n}\sum_i t_{Di} + \bar{t}^2 + \frac{1}{n}\sum_i c_{Di}^2 -$$

$$2\bar{c}\frac{1}{n}\sum_i c_{Di} + \bar{c}^2 = \bar{t}^2 - \bar{t}^2 + \bar{c}^2 - \bar{c}^2 = (\overline{t_0^2} + \overline{c_0^2}) -$$

$$(\overline{t_0}^2 + \overline{c_0}^2) + 2D(\overline{t_0 y_0} + \overline{c_0 z_0} - \overline{t_0}\,\overline{y_0} - \overline{c_0}\,\overline{z_0}) +$$

$$D^2(\overline{y_0^2} + \overline{z_0^2} - \overline{y_0}^2 - \overline{z_0}^2)$$

Then, when the residual reaches its minimum in (Equation 7), D is expressed using (Equation 8) below.

[Mathematical 5]

$$\frac{dS}{dD} = \quad \text{(Equation 8)}$$

$$2(\overline{t_0 y_0} + \overline{c_0 z_0} - \overline{t_0}\,\overline{y_0} - \overline{c_0}\,\overline{z_0}) + 2D(\overline{y_0^2} + \overline{z_0^2} - \overline{y_0}^2 - \overline{z_0}^2) = 0$$

(Equation 9) below can be obtained from (Equation 7).

[Mathematical 6]

$$D = -\frac{(\overline{t_0 y_0} + \overline{c_0 z_0} - \overline{t_0}\,\overline{y_0} - \overline{c_0}\,\overline{z_0})}{(\overline{y_0^2} + \overline{z_0^2} - \overline{y_0}^2 - \overline{z_0}^2)} \quad \text{(Equation 9)}$$

Obtainment of D means that the distance f in the optical axis direction from the vertex of the eyeball-side surface 4 (concave surface) is obtained. As a result, the focal position $A_1$ of rays that have passed through one convex portion 61 is specified.

The focal positions $A_2$ and $A_3$ of rays that have passed through the other convex portions 62 and 63 are also specified using this method.

Note that with regard to the base region, the location (the focal position B) at which rays are concentrated may also be specified through the ray tracing process, or may be specified using a known lens meter or the like. The distance between the vertex of the eyeball-side surface 4 (concave surface) and the location in the optical axis direction is expressed by f' (=1/D' (focus value, in units of diopters)).
(9. Specifying of Convergence Position (Focal Position) of Rays that Enter Base Region)

In this ninth step, the focal position B of rays that have passed through the base region is also specified using the method by which D has been obtained (S9). At this time, the distance f can be read as the distance f' (=1/D (focus value, in units of diopters)).
(10. Evaluation of Focal Positions)

The focal positions are evaluated in a tenth step (S10). As a specific example, evaluation is performed regarding whether a defocus power, which is expressed by the difference between the average of the defocus values at the focal positions A that respectively correspond to the multiple convex portions 6 and the focus value at the focal position B, is within a predetermined tolerance compared to a planned defocus power.

Note that if the predetermined tolerance is within ±0.1 mm (±0.5 diopters), for example, it is determined that the defocus power is within an allowable range.

Also, a planned defocus power is determined in advance depending on how much myopia progression control effect is to be imparted according to the wearer of an eyeglass lens. The planned defocus power is in a range of 2.0 D to 5.0 D (more specifically 3.0 D to 4.0 D), which is an example. In this case, in other words, the defocus power expressed by the difference between the average of the defocus values at the focal positions A and the focus value at the focal position B is in a range of 1.5 D to 5.5 D (specifically, 2.5 D to 4.5 D, and more specifically, 3.0 D to 4.0 D).
(11. Evaluation of Stray Light)

Stray light is evaluated in the eleventh step (S11). As a specific example, the eyeglass lens is evaluated based on the number of stray light rays that is obtained by subtracting, from the total number of rays when ray tracing is performed on the predetermined evaluation region, the total number of rays at the plurality of focal positions A where rays, which have passed through the plurality of convex portions in the predetermined evaluation region, converge, and the number of rays at the focal position B where rays, which have passed through a portion other than the plurality of convex portions in the predetermined evaluation region, converge, the focal position B being located on the eyeball side relative to the plurality of focal positions A.

The rays that converge at the focal positions A and B may also be defined by the transmission points of the rays on the image plane including the focal positions A and B referring to the rays present within a predetermined range (e.g., within 1 arc-minute of the visual angle) from the focal positions A and B.

In addition, the "number of rays" indicates the number of rays that converge at the focal positions A or B.

The "number of rays at the focal positions A" refers to the number of rays in a certain range (e.g., within 1 arc-minute of the visual angle) from the center of light distribution (the average value of the intersection coordinates) at the focal positions $A_1$, $A_2$, $A_3$, ... , and $A_n$ that respectively correspond to the multiple convex portions 6 in one predetermined evaluation region. The "number of rays at a focal position A" may also be referred to as the number of defocus rays. Note that n is equal to 3 in the predetermined evaluation region E1 in one aspect of the present disclosure. Also, if the size of a convex portion 6 is as described in (1) Configuration of eyeglass lens (shape of object-side surface), and the diameter of the predetermined evaluation region is the pupil diameter (e.g., a diameter of 2 to 6 mm), the maximum value of n is 7 as an example (e.g., the predetermined evaluation region E3 in FIG. 1).

That is, the "total number of rays at the focal positions A" refers to the total number of rays in a certain range from the center of light distribution at the focal positions $A_1$, $A_2$, $A_3$, ... , and $A_n$ that respectively correspond to the multiple convex portions 6 in one predetermined evaluation region.

Similarly, the "number of rays at the focal position B" refers to the number of rays in a certain range (e.g., within 1 arc-minute of the visual angle) from the center of light distribution (the average value of the intersection coordinates) at the focal position B that corresponds to the base region in one predetermined evaluation region. The "number of rays at the focal position B" is also referred to as the number of focus rays.

Also, the "number of stray light rays" refers to the number of rays obtained by subtracting the total number of rays at the multiple focal positions A and the number of rays at the focal position B from the total number of rays when performing ray tracing on one predetermined evaluation region.

Note that the method for obtaining the number of stray light rays described in the previous paragraph is used for one predetermined evaluation region. If a plurality of predetermined evaluation regions are provided, the ray tracing process is performed on the plurality of predetermined evaluation regions. In this case, the "number of rays at the focal positions A" and the "number of rays at focal position B" in each of the plurality of predetermined evaluation regions are added up, and the number of rays obtained by subtracting the total number of rays at the plurality of focal positions A and the number of rays at the focal position B from the total number of rays when performing ray tracing on each of the multiple predetermined evaluation regions is referred to as the "number of stray light rays".

That is, in one aspect of the present disclosure, a case where the "number of rays at the focal positions A", the "number of rays at the focal position B", and the "number of stray light rays" in one predetermined evaluation region are evaluated is also included in the technical idea of the present disclosure. Also, a case where the "number of rays at the focal positions A", the "number of rays at the focal position B", and the "number of stray light rays" in all the predetermined evaluation regions that have been subjected to ray tracing are evaluated is also included in the technical idea of the present disclosure.

Hereinafter, when the focal positions $A_1, A_2, A_3, \ldots$, and $A_n$, that is, the focal positions A are expressed, a case where evaluation is made in one predetermined evaluation region (the maximum value of n is 7 as an example), and a case where evaluation is made in all the predetermined evaluation regions (n represents the total number of convex portions 6 present in each predetermined evaluation region) are also included.

It can be evaluated that the smaller the number of stray light rays is, the better the performance of the eyeglass lens is. There is no particular limitation on the evaluation method, and the stray light ratio (%) is obtained from the ratio of the number of stray light rays to the total number of rays, and evaluation is made using smaller-is-better approach. Also, evaluation is made based on whether or not it is within a predetermined tolerance upper limit (e.g., 20% or less, preferably 10% or less, for example.

(12. Evaluation of Number of Effective Rays)

Contrary to the eleventh step, the number of effective rays is evaluated in the twelfth step. As a specific example, the total number of rays (effective rays) P that have passed through each convex portion 6 and converge at the focal positions $A_1, A_2, A_3, \ldots$, and $A_n$, and the number of effective rays Q that have passed through the base region and converge at the focal position B are found, and the ratio between the numbers of rays is obtained (S12). Evaluation may be made based on whether or not this ratio between the numbers of rays satisfies a predetermined tolerance (e.g., P:Q=4:6 to 6:4). Note that evaluation may be made based on the percentage of the number of rays at the focal positions A to the total number of rays, instead of the ratio between the numbers of rays P:Q. Both cases are included in the evaluation of an eyeglass lens based on the number of rays at the focal positions A.

Note that the eleventh step and the twelfth step may be performed together, or only one of them may be performed. In any case, the eyeglass lens is evaluated based on the obtained number of rays. Furthermore, it is possible to evaluate the minimum eyeglass lens with the obtained number of rays as long as the total number of rays at a plurality of focal positions A at which rays, which have passed through the convex portions 6, respectively converge can be obtained.

(3) Eyeglass Lens

With regard to the eyeglass lens 1, the number of stray light rays and the stray light ratio are specified using the method described in (2) Procedure for evaluating surface shape. It is preferable that the eyeglass lens 1 is configured such that the stray light ratio is 20% or less, and preferably 10% or less, so that the eyeglass lens 1 has desired optical properties and exhibits the myopia progression control effect. Also, (the total number of rays P at the plurality of focal positions A):(the number of rays Q at the focal position B) is preferably 4:6 to 6:4.

(4) Method for Producing Eyeglass Lens

Next, a method for producing the eyeglass lens 1 having the above-described configuration will be described.

In the production of the eyeglass lens 1, first, the lens base member 2 is molded using a known molding method, such as cast polymerization. By using a mold having a molding surface equipped with multiple concave portions and performing molding through cast polymerization, for example, the lens base member 2 having the convex regions 6 on at least one surface is obtained.

Then, when the lens base member 2 is obtained, next, the hard coating film 8 is formed on the surface of the lens base member 2. The hard coating film 8 can be formed by using a method of immersing the lens base member 2 in a hard coating liquid, through spin coating, or the like.

When the hard coating film 8 is formed, next, the anti-reflection film 10 is formed on the hard coating film 8. The hard coating film 8 can be formed by depositing the anti-reflection agent through vacuum deposition.

The eyeglass lens 1 that has the object-side surface 3 with multiple convex portions 6 that protrude toward the object can be obtained using the production method of this procedure.

Incidentally, the production method in one aspect of the present disclosure includes the above-described evaluation method of the procedure. That is, the stray light ratio is found through the above-described steps. Then, the eyeglass lens 1 is produced with the results of obtaining the stray light ratio being reflected.

Specifically, after a test lens, which is to serve as a sample, is produced, for example, the stray light ratio of the test lens is found, and if the stray light ratio is out of the allowable range, a test lens is produced again with the conditions under which the hard coating film 8 or the antireflection film 10 is formed being changed. If the stray light ratio is in the allowable range, the eyeglass lens 1 of a product version is produced under the same conditions as the test lens. It is possible to obtain the eyeglass lens 1 whose stray light ratio is in the allowable range if production is performed with the results of obtaining the stray light ratio being reflected.

Note that although a case where the stray light ratio is reflected using a test lens has been described as an example here, there is no limitation thereto. If modification processing can be performed on the object-side surface 3, for example, when the stray light ratio is out of the allowable range, the stray light ratio may be reflected by performing modification processing such that the stray light ratio is within the allowable range.

(5) Details of Predetermined Step in Procedure for Evaluating Surface Shape

The overall evaluation method has been described in (2) Procedure for evaluating surface shape by describing the overview of each step. The following describes a step that needs to be separately described in detail.

(Details of Cluster Analysis)

A specific procedure for classification of data into data groups utilizing cluster analysis in the third step will be described later in detail.

Figure 8:
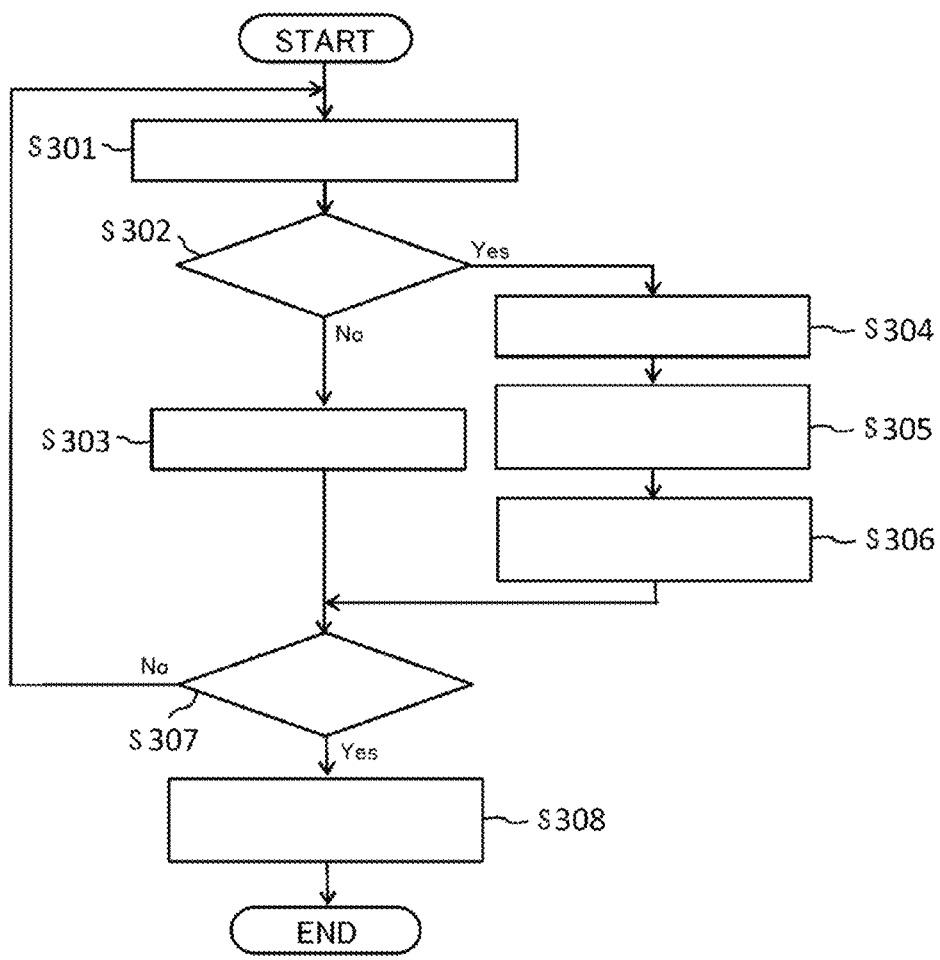
FIG. 8 is a flowchart showing a specific procedure of cluster analysis in the evaluation method shown in FIG. 5.

FIG. 8 is a flowchart showing a specific procedure of cluster analysis in the evaluation method of FIG. 5.

As shown in FIG. 8, in the third step, given XYZ-coordinate value data is focused on in the acquired three-dimensional data, and the Z-coordinate value is extracted from the XYZ-coordinate value data (S301). When the Z-coordinate value is extracted, a noise component may be removed through smoothing utilizing the Z-coordinate values at the surrounding coordinate points, for example. Also, the range of three-dimensional data from which the Z-coordinate value is to be extracted may be the entire XYZ-coordinate value data included in the three-dimensional data, or may be limited to a specific trimmed range (e.g., a rectangular range in which one side thereof has a predetermined size).

When the Z-coordinate value has been extracted, then, it is determined whether or not the Z-coordinate value is larger than the threshold by comparing the Z-coordinate value with the threshold (height threshold) (S302). As a result, if the Z-coordinate value does not exceed the threshold, the data point is present at a position that does not protrude relatively, and thus the XYZ-coordinate value data thereof is classified as being related to the base surface region, and is associated with an identification flag indicating that the XYZ-coordinate value data belongs to a data group constituting the base surface data (S303). On the other hand, if the Z-coordinate value exceeds the threshold, the data point is present at a position that protrudes relatively, and thus the XYZ-coordinate value data thereof is classified as being related to the convex portions 6, and is associated with an identification flag indicating that the XYZ-coordinate value data belongs to a data group constituting segment data (S304).

Also, regarding XYZ-coordinate value data belonging to a data group constituting segment data, classification of which one of the plurality of convex portions 6 the XYZ-coordinate value data is related to is further performed (S305). Classification of data into the data groups regarding the plurality of respective convex portions (convex portions are also referred to as "segments" hereinafter) 6 is performed through clustering (grouping) utilizing k-means, for example.

Specifically, pieces of XYZ-coordinate value data associated as segment data are checked one-by-one, and the first XYZ-coordinate value data is registered as a "first cluster" and is classified as XYZ-coordinate value data belonging to the group (data group) thereof. The central coordinate point of the first cluster is the XY-coordinate point of the XYZ-coordinate value data in a situation where one piece of XYZ-coordinate value data belongs to the group. Also, if there is successive XYZ-coordinate value data, the distance between the XY-coordinate point of the XYZ-coordinate value data and the central coordinate point of the already registered cluster is obtained, and the successive piece of coordinate vale data is registered as belonging to a cluster with the shortest distance. However, if the obtained distance is greater than or equal to a predetermined distance value, a new cluster (e.g., a "second cluster") is created, and the obtained distance is registered as belonging to the new cluster.

With the XYZ-coordinate value data associated with the segment data through clustering in such a procedure, the positions of the convex portions 6 need not be clarified in advance, and the XYZ-coordinate value data is classified according to which convex portion 6 the data group of the XYZ-coordinate value data is related to.

After the XYZ-coordinate value data is classified according to which cluster it belongs to, for the cluster according to which it was classified (i.e., the cluster to which XYZ-coordinate value data was added), the position of the center of gravity of the XY-coordinate point in each set of XYZ-coordinate value data belonging to the cluster is calculated (S306). Then, the central coordinate point of the cluster is updated such that the result of calculation of the position of the center of gravity is the central coordinate point. That is, every time XYZ-coordinate value data is classified according to which cluster it belongs to, the central coordinate point of the cluster to which the XYZ-coordinate value data is added will be updated.

Data classification processing performed according to the above-described procedure is repeatedly performed on XYZ-coordinate value data to be processed (S301 to S307) until completion of the processing of the XYZ-coordinate value data to be processed (S307).

After clustering has been performed on the XYZ-coordinate value data associated as segment data in this manner, data regarding boundary-vicinity regions (referred to as "boundary-vicinity data"), which are transition regions between the convex portions 6 and the base region, are separated from the respective clusters by performing re-clustering on the clusters (S308).

Specifically, XYZ-coordinate value data within a predetermined distance from the central coordinate point of each cluster (e.g., within a radius of 0.45 mm from the coordinates of the center) is regarded as data belonging to the cluster, and re-clustering is performed such that the other XYZ-coordinate value data is separated from the cluster and is regarded as boundary-vicinity data. This is because, if data is uniformly classified according to the height threshold as described above, the convex portions 6 and the base region may not be properly classified due to the differences in the degree of waviness of the base region around the convex portions 6. In contrast, if base surface data and segment data are classified using the threshold, the segment data is grouped into clusters through the above-described clustering, the central coordinate point (e.g., the position of the center of gravity) of each cluster is obtained, and data regarding a region within a predetermined distance from the central coordinate point is regarded as segment data, the convex portions 6 and the base region can be appropriately and accurately classified.

The three-dimensional data processed in the third step is classified through the above-described processing performed according to the procedure into a data group for segment data regarding the respective convex portions 6, a data group for the base surface data regarding the base region, and a data group for boundary-vicinity data regarding boundary-vicinity regions, which are transition regions between the convex portions 6 and the base region.

(Specific Examples of Data Classification and Reference Shape Data Extraction)

Here, classification of data into the data groups in the third step and extraction of reference shape data in the fourth step will be described using specific examples.

Figure 9:
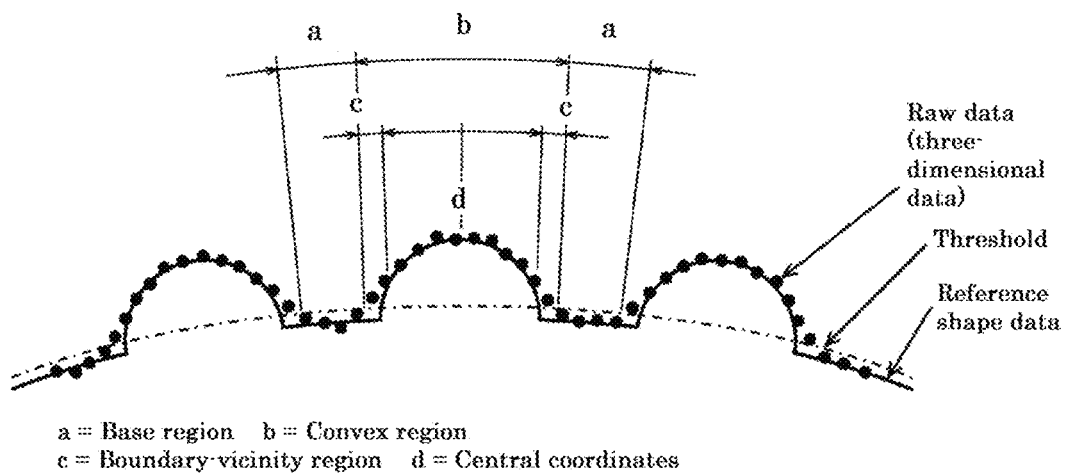
FIG. 9 is an illustrative diagram schematically showing a specific example of data classification and reference shape data extraction performed using the evaluation method according to an aspect of the present disclosure.

FIG. 9 is a diagram schematically illustrating specific examples of data classification and reference shape data extraction using the evaluation method according to one aspect of the present disclosure.

As shown in FIG. 9, when raw data (three-dimensional data) is acquired, a data group of XYZ-coordinate value data (see black circle marks in FIG. 9) regarding the surface shape of the object-side surface 3 of the eyeglass lens 1 is obtained, and thus a threshold (see dash-dot line in FIG. 9) is derived from the data group, and the XYZ-coordinate value data is classified using the threshold into base surface data (at a height position that does not exceed the threshold) and segment data (at a height position that exceeds the threshold). Then, the segment data is classified through clustering according to which convex portion 6 the data is related to (i.e., which cluster the data belongs to). Also, data outside the predetermined distance from the central coordinates is separated from the XYZ-coordinate value data belonging to each cluster, as boundary-vicinity data through re-clustering.

Accordingly, the XYZ-coordinate value data constituting raw data (three-dimensional data) is classified into segment data regarding the respective convex portions 6, base surface data regarding the base region, or boundary-vicinity data regarding boundary-vicinity regions.

After data classification, subsequently, curve fitting is performed on each of the data groups into which the data is classified. Specifically, with regard to the base surface data, data regarding a curved surface shape expressing an approximate sphere of the base region is obtained by performing curve fitting only on the base surface data. Also, with regard to segment data, data regarding a curved surface shape expressing an approximate sphere of each convex portion 6 is obtained by performing curve fitting individually on the respective clusters (i.e., the respective convex portions 6). Then, when pieces of data regarding the respective curved surface shapes are obtained individually, the resulting data is combined to obtain shape data regarding one surface shape, and thereby reference shape data (see solid line in FIG. 9) regarding the object-side surface 3 of the eyeglass lens is extracted.

If reference shape data is extracted by performing curve fitting on each of the data groups into which the data is classified in this manner, even if there is sagging in a boundary-vicinity region in the three-dimensional data, it is possible to eliminate the influence of the sagging on the reference shape data. That is, when reference shape data is extracted, the extraction can be optimized.

(6) Variations and the Like

Although one aspect of the present disclosure was described above, the disclosed content described above indicates exemplary aspects of the present disclosure. That is to say, the technical scope of the present disclosure is not limited to the above-described exemplary aspects, and various modifications can be made without departing from the gist thereof.

The evaluation method according to the present disclosure and the allowable range of the stray light ratio obtained using the evaluation method are applicable regardless of the presence or absence of the coating film (i.e., even with an eyeglass lens that is not coated with a film), for example.

In one aspect of the present disclosure, classification into data groups utilizing cluster analysis is described as an example in (3. Classification into data groups).

On the other hand, there may be a method in which information regarding the boundaries between multiple convex portions 6 and the base region is determined in advance, and raw data that is consistent with the boundary information is obtained. However, in this case, the plurality of convex portions 6 and the base region need to be accurately positioned in (1. Acquisition of raw data (three-dimensional data)).

Also, there may be a method in which raw data is subjected to coordinate transformation so as to be consistent with boundary information. However, in this case, even if raw data is represented by the Z height on the XY grid points, shifting may occur due to coordinate transformation.

Therefore, it is preferable to perform classification of data into data groups utilizing cluster analysis described in one aspect of the present disclosure.

In one aspect of the present disclosure, a case where rays that enter the lens model in ray tracing is divided into two, specifically, rays that enter the plurality of convex portions 6 and rays that enter the base region, is described in (7. Definition of portion where rays enter in ray tracing). On the other hand, boundary-vicinity regions between multiple convex portions 6 and the base region may be newly defined.

Fortunately, data can be classified into a data group for segment data regarding the respective convex portions 6, a data group for the base surface data regarding the base region, and a data group for boundary-vicinity data regarding boundary-vicinity regions, which are transition regions between the convex portions 6 and the base region.

The data group for the boundary-vicinity data may be used to divide the rays that enter the lens model through ray tracing into three, specifically, rays that enter the plurality of convex portions 6, rays that enter the base region, and rays that enter the boundary-vicinity regions.

In one aspect of the present disclosure, a case where the coordinates and vectors of portions of rays that are emitted from the eyeglass lens and are obtained through ray tracing are used, and the method of least squares is used at that time is described as an example in (8. Specifying of convergence position (focal position) of rays that enter convex portions). On the other hand, the focal positions A and the focal position B can be specified in an aspect other than this aspect. The method in the other aspect will be described below as an example.

Figure 10:
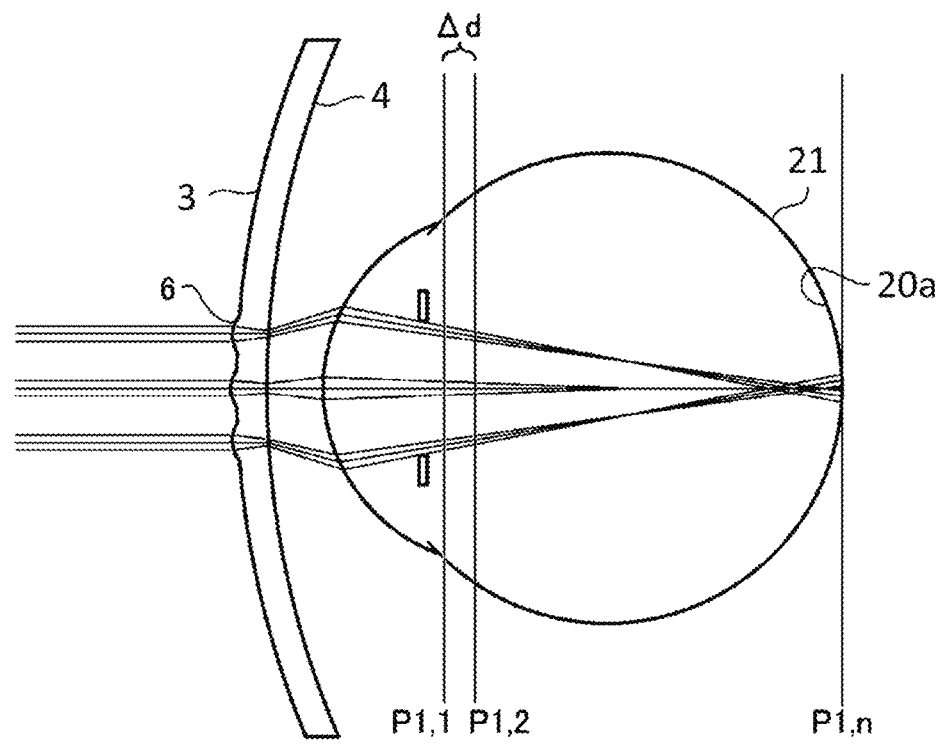
FIG. 10 is a diagram (1) illustrating a method for specifying a position on which rays are focused.
Figure 11:
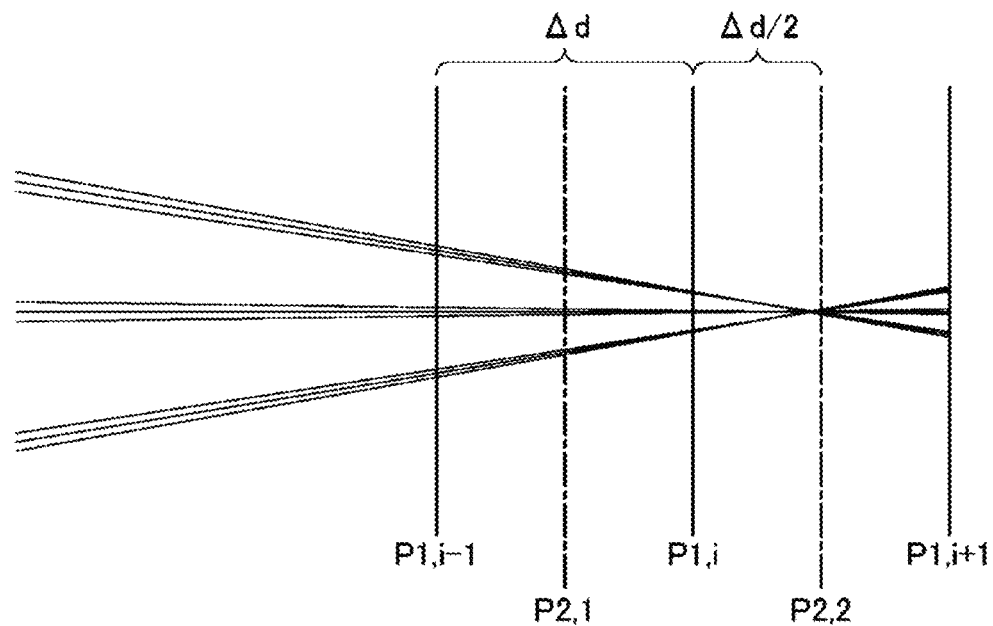
FIG. 11 is a diagram (2) illustrating a method for specifying a position on which rays are focused.
Figure 12:
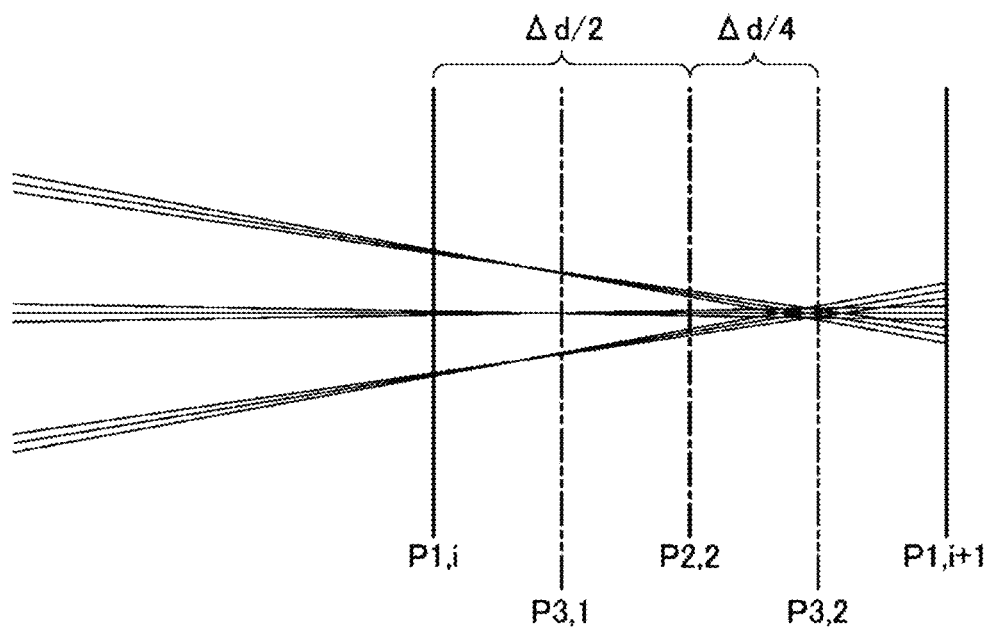
FIG. 12 is a diagram (3) illustrating a method for specifying a position on which rays are focused.

FIGS. 10 to 12 are diagrams (1 to 3) illustrating the method for specifying positions on which rays are focused.

FIG. 13 is a flowchart showing the method for specifying positions on which rays are focused.

First, as shown in FIG. 10, in S801, measurement planes $P1,1$ to $P1,n$ are set at increments of a predetermined separation interval $\Delta d$ (e.g., 0.1 mm) from a position of 0 mm on the retina 20a of the eyeball model 21 to a position located a predetermined distance away (e.g., at a position located about 16 mm, which is the thickness of the vitreous body, away). Note that the separation interval $\Delta d$ may be set to an interval of 0.2 mm or 1/80 of the axial length of the eye.

Then, a ray tracing process is performed, and the densities of rays in the measurement planes $P1,1$ to $P1,n$ are calculated in S802. The densities of rays need only be calculated by setting a lattice-shaped grid to each measurement plane and calculating the number of rays passing through the grids, for example.

Then, in S803, in order to specify a measurement plane where rays that have entered the convex portion have the maximum density, in the measurement planes $P1,1$ to $P1,n$, the measurement plane $P1,i$ where rays have the first local maximum density is specified based on the predetermined distance. In order to omit calculation, calculation of the ray density may be started from the measurement plane $P1$, and calculation of this step may be terminated when, after the first local maximum density is detected, the value obtained by calculating the ray density decreases to about an intermediate value between the value in the measurement plane P1 and the first local maximum value.

Then, as shown in FIG. 11, in S804, a measurement plane P2,1 and a measurement plane P2,2 are set at positions located a separation distance Δd/2 frontward and rearward from the measurement plane P1,i with the maximum density. Then, the densities of rays in the measurement plane P2,1 and the measurement plane P2,2 are calculated in S805. A measurement plane with the maximum density is specified in the measurement planes P2,1, P2,2, and P1,i in S806.

Then, in S807, the same steps as S804 to S806 are repeated until the separation distance becomes significantly short. That is, as shown in FIG. 12, a step of setting a new measurement plane (P3,1 and P3,2 in FIG. 12) at a position located a new separation distance (Δd/4 in FIG. 12), which is half of the previous separation distance, forward and rearward from the measurement plane (P2,2 in FIG. 12) that previously had the maximum density, a step of calculating the density of rays in the new measurement plane, and a step of specifying the measurement plane that previously had the maximum density and a measurement plane out of the new measurement planes that has the maximum are repeated.

The method in the other aspect is summarized as the following configuration.

The method includes a shape measurement step of measuring a shape of an object-side surface of an eyeglass lens provided with minute convex portions that protrude from the object-side surface, on the object-side surface on the object side of the eyeglass lens;

an actual equipment virtual model setting step of setting an actual equipment virtual model including an eyeglass lens model based on the measured shape and an eyeball model; and an actual equipment convergence position specifying step of specifying an actual equipment convergence position at which rays converge in front of the retina of the eyeball model, by performing ray tracing calculation on the actual equipment virtual model.

The following configuration may be added to this configuration.

The method further includes a design model setting step of setting a design model including the eyeglass lens model that is set based on design information and the eyeball model; and a design convergence position specifying step of specifying a design convergence position at which rays converge in front of the retina of the eyeball model, by performing ray tracing calculation on the design model.

In the design model setting step, a model in which convex portions that are based on design information are formed on the object-side surface of the lens without power is set as the eyeglass lens model.

Positions on which rays are focused can be specified through the following step. Note that this step may be performed together with the method of using the coordinates and vectors of the emitted portions of the rays from the eyeglass lens according to one aspect of the present disclosure, and using the method of least squares. The approximate focal positions A and B may be found using the flowchart shown in FIG. 13, and the method according to one aspect of the present disclosure may be used at these approximate positions, for example.

In one aspect of the present disclosure, the eyeglass lens is evaluated based on the total number of rays at the multiple focal positions A at which rays, which have passed through the convex portions, converge when performing ray tracing on the eyeglass lens. On the other hand, the eyeglass lens may be evaluated by specifying the multiple focal positions A (i.e., specifying defocus values) without checking the total number of rays at the multiple focal positions A. That is, the eyeglass lens may be evaluated based on the multiple focal positions A at which rays, which have passed through the convex portions, converge when performing ray tracing on the eyeglass lens.

At this time, the eyeglass lens may be evaluated by specifying the focal position B (i.e., specifying the focus value) without checking the number of rays at the focal position B and comparing the defocus values and the focus value.

SUMMARY

Hereinafter, the "method for evaluating an eyeglass lens and the eyeglass lens" of this disclosure will be summarized.

One embodiment of the present disclosure is as follows.

"A method for evaluating an eyeglass lens that has a plurality of convex portions on at least one of an object-side surface and an eyeball-side surface, the method including evaluating the eyeglass lens based on the total number of rays at a plurality of focal positions A at which rays, which have passed through the plurality of convex portions in a predetermined evaluation region of the eyeglass lens, converge when ray tracing is performed on the predetermined region."

LIST OF REFERENCE NUMERALS

1 . . . Eyeglass lens, 2 . . . Lens base member, 3 . . . Object-side surface, 4 . . . Eyeball-side surface, 6, 6a, 6b, 61 to 72 . . . Convex portion, 8 . . . Hard coating film, 10 . . . Antireflection film, 20 . . . Eyeball, 20a . . . Retina, 21 . . . Eyeball model

The invention claimed is:

1. A method for evaluating an eyeglass lens that has a plurality of convex portions, and base region where the convex portions are not formed, on at least one of an object-side surface and an eyeball-side surface, the method comprising evaluating the eyeglass lens based on the number of rays at a plurality of focal positions A at which rays, which have passed through the plurality of convex portions in a predetermined evaluation region of the eyeglass lens, converge when ray tracing is performed on the predetermined region the evaluation of the eyeglass lens comprising:

obtaining surface shape data of a surface that has the plurality of convex portions;

specifying the plurality of focal positions A at which rays, which have passed through the plurality of convex portions in the predetermined evaluation region, converge, and the focal position B at which rays, which have passed through a portion other than the plurality of convex portions in the predetermined evaluation region, converge, the focal position B being located on the eyeball side relative to the plurality of focal positions A, by performing ray tracing on a lens model obtained based on the surface shape data;

obtaining the total number of rays at the focal positions A and the number of rays at the focal position B; and evaluating the eyeglass lens based on the obtained number of rays.

2. The method for evaluating an eyeglass lens according to claim 1,
wherein the plurality of focal positions A are specified based on coordinates and vectors of emitted portions of rays from the eyeglass lens that are obtained through the ray tracing.

3. The method for evaluating an eyeglass lens according to claim 1,
wherein the predetermined evaluation region has a size of a pupil diameter and a plurality of the predetermined evaluation regions are present.

4. The method for evaluating an eyeglass lens according to claim 1,
wherein the eyeglass lens is evaluated based on the number of stray light rays that is obtained by subtracting, from the total number of rays when ray tracing is performed on the predetermined evaluation region, the total number of rays at the plurality of focal positions A at which rays, which have passed through the plurality of convex portions in the predetermined evaluation region, converge, and the number of rays at a focal position B at which rays, which have passed through a portion other than the plurality of convex portions in the predetermined evaluation region, converge, the focal position B being located on the eyeball side relative to the plurality of focal positions A.

5. An eyeglass lens that has a plurality of convex portions on at least one of an object-side surface and an eyeball-side surface,
wherein a defocus power represented by a difference between an average of defocus values at focal positions A that respectively correspond to the convex portions in any predetermined evaluation region with a diameter of 2 to 6 mm, and a focus value at a focal position B at which rays, which have passed through a portion other than the plurality of convex portions in the predetermined evaluation region, converge, the focal position B being located on the eyeball side relative to the plurality of focal positions A, is within ±0.5D with respect to a planned defocus power, and
a stray light ratio (%) obtained from a ratio of the number of stray light rays to the total number of rays when ray tracing is performed on the eyeglass lens is 20% or less, the number of the stray light rays being obtained by subtracting, from the total number of rays when the ray tracing is performed, the total number of rays at the focal positions A at which rays, which have passed through the plurality of convex portions, converge, and the number of rays at a focal position B at which rays, which have passed through the portion other than the plurality of convex portions, converge.

6. The method for evaluating an eyeglass lens according to claim 2,
wherein the predetermined evaluation region has a size of a pupil diameter and a plurality of the predetermined evaluation regions are present.

7. The method for evaluating an eyeglass lens according claim 6,
wherein the eyeglass lens is evaluated based on the number of stray light rays that is obtained by subtracting, from the total number of rays when ray tracing is performed on the predetermined evaluation region, the total number of rays at the plurality of focal positions A at which rays, which have passed through the plurality of convex portions in the predetermined evaluation region, converge, and the number of rays at a focal position B at which rays, which have passed through a portion other than the plurality of convex portions in the predetermined evaluation region, converge, the focal position B being located on the eyeball side relative to the plurality of focal positions A.

8. The eyeglass lens of claim 7, further comprising:
that has a plurality of convex portions on at least one of an object-side surface and an eyeball-side surface,
wherein a defocus power represented by a difference between an average of defocus values at focal positions A that respectively correspond to the convex portions in any predetermined evaluation region with a diameter of 2 to 6 mm, and a focus value at a focal position B at which rays, which have passed through a portion other than the plurality of convex portions in the predetermined evaluation region, converge, the focal position B being located on the eyeball side relative to the plurality of focal positions A, is within ±0.5D with respect to a planned defocus power, and
a ratio between the total number of rays P that converge at the focal positions A and the number of rays Q that converge at the focal position B when ray tracing is performed on the eyeglass lens satisfies 4:6 to 6:4.

* * * * *